(12) United States Patent
Michi et al.

(10) Patent No.: US 7,099,766 B2
(45) Date of Patent: Aug. 29, 2006

(54) CRUISE CONTROL SYSTEM HAVING A STOP FUNCTION

(75) Inventors: Harald Michi, Oelbronn-Duerrn (DE);
Michael Scherl, Bietigheim (DE);
Michael Weilkes, Sachsenheim (DE);
Carsten Schroeder, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 66 days.

(21) Appl. No.: 10/842,911

(22) Filed: May 10, 2004

(65) Prior Publication Data
US 2005/0010352 A1 Jan. 13, 2005

(30) Foreign Application Priority Data
May 8, 2003 (DE) .............................. 103 20 722

(51) Int. Cl.
*B60T 8/32* (2006.01)
(52) U.S. Cl. .................... 701/96; 701/93; 180/170; 123/352
(58) Field of Classification Search ............. 701/1, 701/70, 80, 93, 96; 180/170, 178; 123/361, 123/319, 352
See application file for complete search history.

(56) References Cited

U.S. PATENT DOCUMENTS 6,076,622 A * 6/2000 Chakraborty et al. ....... 180/169
6,560,525 B1 * 5/2003 Joyce et al. ................... 701/96
6,820,709 B1 * 11/2004 Zimmermann et al. ...... 180/169
6,876,915 B1 * 4/2005 Kuramochi et al. .......... 701/96
2004/0193354 A1 * 9/2004 Dunoyer et al. .............. 701/96

FOREIGN PATENT DOCUMENTS

DE       199 58 520        6/2001

* cited by examiner

*Primary Examiner*—Thomas G. Black
*Assistant Examiner*—Santanu Chatterjee
(74) *Attorney, Agent, or Firm*—Kenyon & Kenyon LLP

(57) ABSTRACT

A cruise control system for motor vehicles is described, having a sensor device for measuring the vehicle's performance characteristics and for measuring the distance to a target object ahead of the vehicle, and a controller which is used to control the vehicle's speed or acceleration as a function of the measured performance characteristics and distance data and has a stop function for automatically braking the vehicle to a standstill as well as at least one standstill state in which the vehicle is held in a stationary position by automatic brake activation, and from which it may only drive off again via an operational command by the driver, the operational command becoming effective only when a confirmation signal is present in addition to the operational command.

9 Claims, 2 Drawing Sheets

Fig. 1
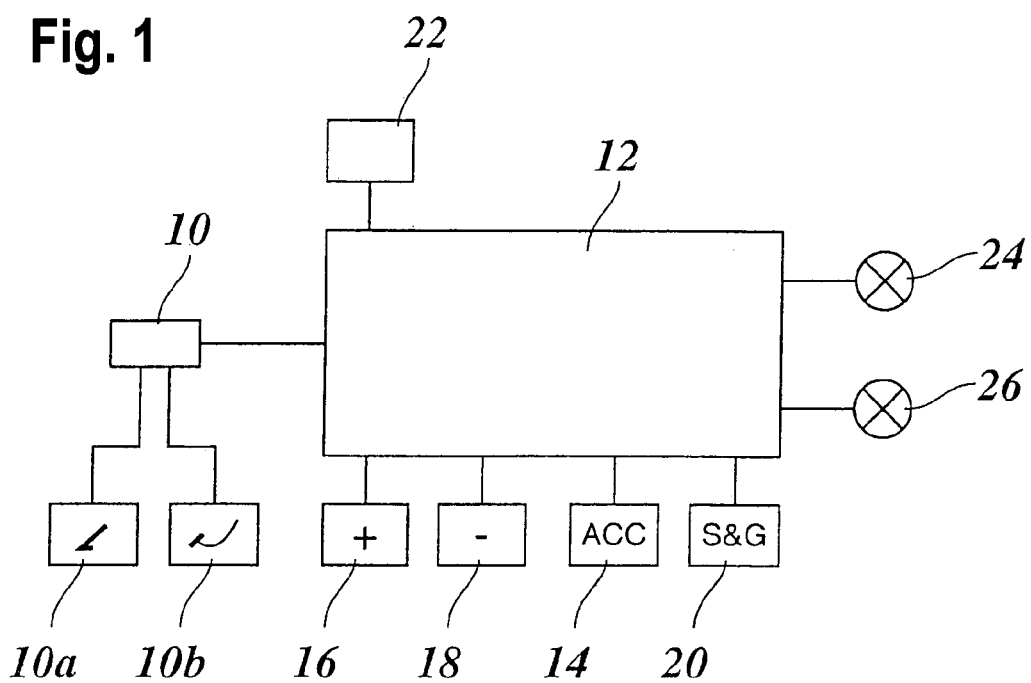
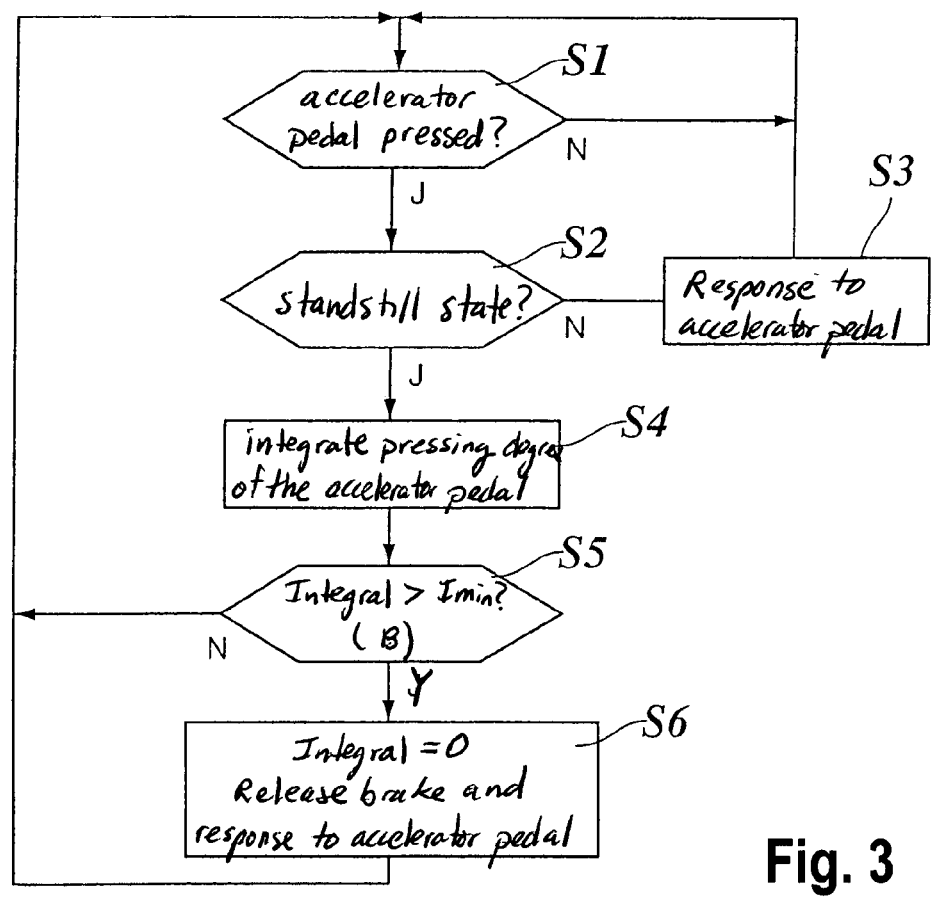
Fig. 3

CRUISE CONTROL SYSTEM HAVING A STOP FUNCTION

FIELD OF THE INVENTION

The present invention relates to cruise control systems for motor vehicles, having a sensor device for measuring the vehicle's performance characteristics and for measuring the distance to a target object located in front of the vehicle, and a controller which is used for controlling the vehicle's speed or acceleration as a function of the measured performance characteristics and has a stop function for automatically braking the vehicle to a standstill as well as at least one standstill state in which the vehicle is held in a stationary position via automatic brake activation and from which it may drive off again only by a driver's operational command.

BACKGROUND INFORMATION

Cruise control systems make it possible to set the vehicle's speed to a desired level selected by the driver, or, if a vehicle whose speed is lower than this desired speed is detected traveling ahead, to automatically maintain an adequate safety distance to the vehicle ahead.

While most conventional cruise control systems of this type, which are also referred to as ACC (Adaptive Cruise Control) systems, are only activatable above a determined minimum speed of, for example, 40 km/h, German Published Patent Application No. 199 58 520 describes a cruise control system also having a stop function which allows the vehicle to be automatically braked to a standstill, e.g., when approaching the tail end of a traffic jam. Within the scope of a stop-and-go function, automatic drive-off is possible under certain conditions when the vehicle ahead starts moving again.

The ACC function, as well as the stop-and-go function may generally be activated or deactivated by the driver via push-button control. If a vehicle having an automatic transmission is braked to a standstill using the stop-and-go function, the controller holds the vehicle brake automatically applied to prevent the vehicle to roll again. If the controller is inactivated by a driver's command, this results in the brake being released and the vehicle rolling again. If the driver has not foreseen this consequence, critical situations or irritations of the driver may result.

SUMMARY OF THE INVENTION

The present invention has the advantage that unintentional overriding of the standstill state and thus rolling of the vehicle, which is unintended or unexpected by the driver, is avoided and at the same time, however, a great ease of use remains during activation and deactivation of the various functions of the cruise control system.

If the driver inputs an operational command which normally results in overriding of the standstill state, then the cruise control system according to the present invention initially checks whether at least one additional confirmation signal is present which reveals the driver's wish to really start moving. Thus, a driver's operational command, input only unintentionally, does not yet result in the overriding of the standstill state, thereby avoiding surprising vehicle responses. However, the vehicle starts to move as soon as it is apparent that the driver has the serious wish to start moving.

A standstill state is understood here as a state of the controller in which the vehicle is held in a stationary position only due to the fact that the controller actively affects the vehicle brake. States in which the vehicle would not start moving anyway, such as the parking brake being applied, or the transmission being in the "neutral," "parking," or "reverse" position, do not qualify as standstill state. An additional feature of the standstill state is that it is overridable only by the driver's operational commands, by pressing the accelerator pedal for example. If, for example, the vehicle ahead stops during the stop-and-go regulation, resulting in one's own vehicle being braked to a stationary position, this would not yet qualify as a standstill state, since, within the scope of the stop-and-go regulation, the vehicle would automatically start moving without the driver's operational command when the vehicle ahead starts to move again. A standstill state is only reached when the prerequisites for the stop-and-go regulation are no longer met, for example, because the target object, i.e., the vehicle ahead which caused the vehicle to decelerate to a stationary position is no longer present or was replaced by another target object, or because such a long time has elapsed since the deceleration of the vehicle to a stationary position that the driver no longer expects an automatic drive-off. Only when this state is reached, are a particular operational command and an additional confirmation of this command required for the vehicle to move again.

The controller basically responds to the driver's various operational commands, for example to pressing the accelerator pedal, to pressing the brake pedal, or to pressing the off button for deactivating the ACC or stop-and-go function. In states other than the standstill state, pressing the brake pedal, as well as pressing the off button have the effect that the controller is deactivated. The driver himself is then required to take over control of the vehicle and, in the event the vehicle comes to a stop, the driver must press the brake pedal himself in order to hold the vehicle in the stationary position. In the standstill state, in contrast, pressing the brake pedal or pressing the off button does not result in the deactivation of the controller, in any case not until the driver's wish is not confirmed via an additional signal, the repeated pressing of the off button, for example. A surprising move of the vehicle is thus prevented when the driver unintentionally or unmindfully presses the off button or briefly presses the brake pedal and then releases it.

In states other than the standstill state, pressing the accelerator pedal has the effect that the cruise control is overridden, i.e., the desired speed is temporarily exceeded or the distance to the vehicle ahead is temporarily reduced to less than the preset distance. In contrast, pressing the accelerator pedal remains ineffective in the standstill state until the confirmation signal is present. This means that even an inadvertent tapping on the gas pedal does not yet result in the vehicle to start moving again.

Pressing the accelerator pedal is preferably interpreted as the operational command for overriding the standstill state. The associated confirmation signal is then triggered, for example, when pressing of the accelerator pedal continues longer than a determined minimum period and/or when the degree of pressing of the accelerator pedal lies above a determined threshold value, possibly again a determined minimum period, or when the integral of the degree of pressing of the accelerator pedal over time reaches a determined threshold value. This ensures that the standstill state is not overridden by an inadvertent tapping of the accelerator pedal, but only when the driver presses this pedal long enough or far enough.

Multiple different standstill states may be provided in the cruise control system, e.g., a state in which the stop-and-go function is activatable because a suitable target object is present, and a state in which the stop-and-go function is not instantaneously activatable, but only when the standstill state is overridden and the vehicle is in motion again.

BRIEF DESCRIPTION OF THE DRAWINGS

FIG. 1 shows a block diagram of the cruise control system and related operating and display elements.

FIG. 3 shows a flow chart of a function of the cruise control system.

DETAILED DESCRIPTION

Figure 2:
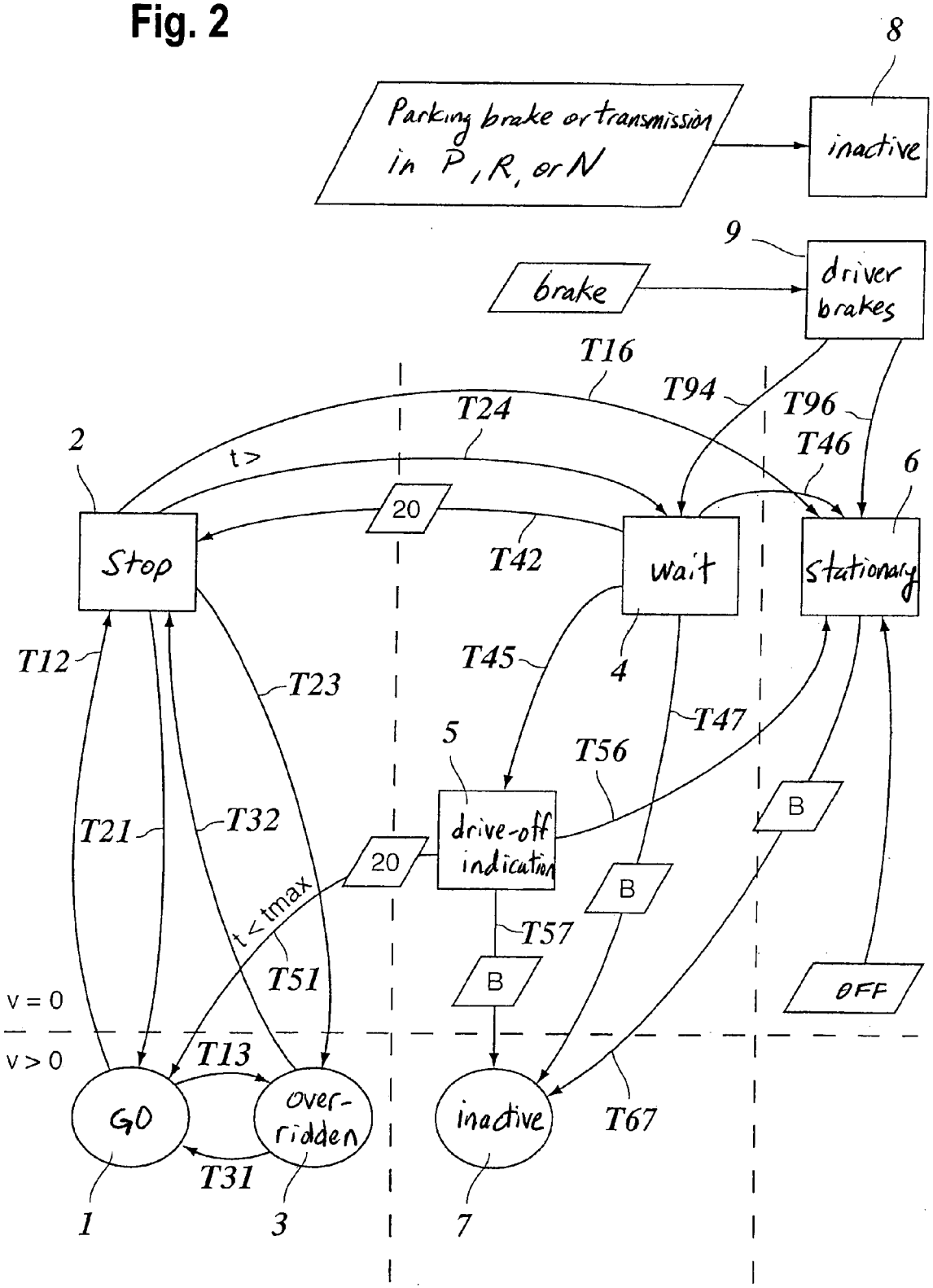
FIG. 2 shows a state diagram for explaining the mode of operation of the cruise control system.

Since the design and mode of operation of a cruise control system having an ACC function are known, FIG. 1 shows only the most important components in a block diagram. A sensor device 10 incorporates a distance sensor, for example a radar sensor, which measures the distance to and relative speed of a vehicle ahead. If the radar sensor detects several targets, for example, several vehicles or stationary targets such as road signs and the like, one target is selected, for example, through a plausibility assessment.

Sensor device 10 also includes known sensors, in particular pedal sensors for an accelerator pedal 10a and a brake pedal 10b, as well as, for example, a driving speed sensor, acceleration sensors for detecting both longitudinal and transverse acceleration, a yaw rate sensor and the like, which are present in the vehicle in any event and whose signals are also used for other control purposes. The signals from the distance sensor and the other sensors are evaluated in an electronic controller 12, which, for example, is formed by a microcomputer. Controller 12 acts on the vehicle's propulsion and braking system in order to regulate the driving speed either to a desired speed selected by the driver or to a suitable distance to the vehicle ahead.

This control function, which will be referred to below as the ACC function, is activated by the driver's pressing an ACC button 14. If a desired speed has already been stored, pressing the ACC button causes control to be resumed to that desired speed. If not, the desired speed is set by the driver briefly pressing a button 16 once the vehicle has reached the desired speed. Further pressing of button 16, or holding it, will cause a progressive increase in the desired speed. Similarly, pressing button 18 will cause a progressive decrease in the desired speed.

The ACC function is switched off automatically as soon as the speed of the vehicle drops below a specified level $V_1$, for example 40 km/h. As soon as the speed is below a higher level $V_2$, for example 50 km/h, however, the driver may activate a stop-and-go function by pressing a button 20. The driver will make use of this possibility, for example, when he is approaching the tail end of a traffic jam. The stop-and-go function then causes the vehicle to be brought to a standstill automatically at a suitable distance to the tail end of the jam. If the stopped vehicle ahead drives forward for a short distance, the stop-and-go function then causes the vehicle to drive off automatically and move a short distance forward. In this process the speed of the vehicle is limited automatically to speed $V_2$ or to a lower desired speed selected by the driver using buttons 16 and 18.

The ACC function and basically also the stop-and-go function may be switched off by means of a button 22 (shut-off button).

Buttons 14, 16, 18, 20 and 22 may also be integrated into a multi-function lever, which is located, for example, on the steering wheel. Alternatively or additionally the commands may also be input with the aid of a voice recognition system.

The mode of operation of the cruise control system during the stop-and-go function is illustrated in FIG. 2 based upon a state diagram. States in which the vehicle is stationary are indicated by rectangular symbols, while states in which the vehicle is in motion, are indicated by ovals. Allowed transitions between the states are indicated by arrow symbols. Since the main focus of the discussion is directed to the system characteristics when the vehicle is stationary, only those transitions are shown in which at least one stationary state is involved.

The principal items of the stop-and-go function are the states 1 "go" and 2 "stop." In state 1, regulation takes place either to the desired speed or to the distance to a detected target object. A transition T12 into state 2 takes place when the target object stops. A transition T21 into state 1 takes place automatically when the target object moves again.

In state 3, the controller is overridden by the driver pressing acceleration pedal 10a. In state 2, a transition T23 into state 2 takes place instantaneously when the acceleration pedal is pressed. If the driver releases the acceleration pedal again while the vehicle is stationary, a return into state 2 takes place via transition T32.

If, in state 2, the target object remains stationary for a long period of time, there is the danger that the driver no longer anticipates an immediate move and directs his attention to other things. Therefore, a transition T24 from state 2 into a first standstill state 4 "wait" takes place after a determined time interval tlimit has elapsed. From this standstill state, the vehicle cannot automatically start moving again since the stop-and-go function is no longer active. When the target object starts moving again, a transition T45 into a state 5 "drive-off indication" takes place instead, in which an optical or acoustic indication is output to the driver. If the driver subsequently presses button 20 within a determined time period tmax to reactivate the stop-and-go function, the vehicle drives off and a transition T51 to state 1 takes place. In this case, the circumstance that the operational command, i.e., pressing of button 20, takes place directly after output of the drive-off indication qualifies as a confirmation signal that the driver indeed wishes to start moving and did not press button 20 merely unintentionally. If time period tmax has elapsed, a transition T56 from state 5 to a second standstill state 6 "stationary" takes place instead.

By pressing button 20, the driver may directly activate the stop-and-go function in first standstill state 4. A transition T42 to state 2 then takes place. A confirmation signal is not necessary in this case, since the target object is still stationary and therefore the vehicle will not start moving even during the transition from state 4 to state 2.

If the target object does not start moving in state 2, but rather disappears because of some other reason, e.g., impairment of the radar sensor, or if the present target object is replaced by a new target object (e.g., cutting-in of another vehicle), then a transition T16 to second standstill state 6 takes place. A corresponding transition T46 from state 4 also takes place under the same conditions. The stop-and-go function is not directly activatable in state 6 "stationary," even if the (new) target object starts moving.

Second standstill state 6 may be left only when the driver actively drives off by pressing the accelerator pedal. In this case, a transition T67 to a state 7 "inactive" takes place, in which the stop-and-go function is not active but it may be activated by pressing button 20. Transition to state 1 then takes place (not shown). However, transition T67 is not directly triggered by pressing the accelerator pedal, but rather only when a confirmation signal B is additionally present.

FIG. 3 illustrates the appropriate decision-making procedure for generating the confirmation signal. Step S1 checks whether the accelerator pedal was at least briefly pressed. As long as this is not the case, step S1 is cyclically repeated. If pressing of the gas pedal was detected, step S2 checks whether a standstill state is present, second standstill state 6 for example. If this is not the case, in state 2 for example, a normal response to pressing of the accelerator pedal takes place in step S3, for example the transition T23 to state 3 "overriding." A return to step S1 takes place subsequent to step S3.

If a standstill state was detected in step S2, then, in step S4, the measured degree of pressing of accelerator pedal 10a is integrated over time (the measured degrees of pressing are simply added up in the case of a fixed cycle time). Step S5 subsequently checks whether the integral has exceeded a determined threshold value Imin. As long as this is not yet the case, a return to step S1 takes place and the integration while cyclically running through the loop is continued using steps S1, S2, and S4. Reaching threshold value Imin triggers confirmation signal B.

Thereupon, the integral is again set back to zero in step 6, the vehicle brake is automatically released, and the response to the accelerator pedal occurs only then, so that the vehicle starts moving and the standstill state is left. A return to step S1 subsequently takes place.

Transition T67, shown in FIG. 2, thus does not take place as soon as the gas pedal is briefly and possibly unintentionally tapped, but only when it is clear, based upon the duration and the degree of pressing of the accelerator pedal, that the driver really intends to start moving. A rolling start of the vehicle, surprising to the driver, is avoided in this way.

State 7 "inactive" may also be reached from first standstill state 4, as well as state 5. Corresponding transitions T47 and T57 also take place only when confirmation signal B is present. State 5 is thus also a standstill state, since the vehicle may start moving from this state only when either confirmation signal B or confirmation signal "t<tmax" is present.

If the driver presses "OFF" button 20 in any of the stationary states, the controller 12 always moves into state 6 "stationary." The controller is therefore not completely inactivated, but holds the vehicle brake actively engaged to prevent a rolling start of the vehicle. A state 8 in which the vehicle is stationary and controller 12 is completely inactivated may be achieved in the exemplary embodiment shown only when the driver himself brakes the vehicle to a standstill, or when he, with the vehicle stationary, engages the parking brake, or switches the gear selector lever to "P" "R," or "N." It is ensured in each of those cases that, also after the release of the brake, the vehicle will not surprisingly start to roll forward. State 8 optionally may be also achieved in that the driver holds "Off" button 22 in the pressed state for a determined amount of time or presses it multiple times. This qualifies again as a confirmation signal, signaling the driver's wish to take over control himself.

If the driver presses brake pedal 10b, this, as long as the vehicle rolls (e.g., in state 1), normally results in the stop-and-go function being inactivated (transition into state 7). If, however, the vehicle is already stationary at the time the brake pedal is pressed, a transition into a state 9 "driver brakes" takes place instead in the exemplary embodiment described. If the driver subsequently releases the brake pedal, either a transition T94 into state 4 or a transition T96 into state 6 takes place, depending on whether the current target object is still present or not. It is ensured in both cases that the vehicle brake is actively engaged either in state 4 or in state 6, so that the vehicle does not start to roll again when the driver releases the brake pedal.

In a modified embodiment, controller 12 may be programmed in such a way that transition T57 from state 5 "drive-off indication" into state 7 "inactive" takes place not only due to confirmation signal B, but already when the gas pedal is briefly tapped within time interval tmax. The confirmation signal for this process would then alternatively be formed in that time interval tmax is complied with, as when pressing button 20.

What is claimed is:

1. A cruise control system for a motor vehicle, comprising:
    a sensor device for measuring a performance characteristic of the motor vehicle and for measuring a distance to a target object ahead of the motor vehicle; and
    a controller for controlling one of a speed and an acceleration of the motor vehicle as a function of the measured performance characteristic and distance data, the controller providing a stop function for automatically braking the motor vehicle to a standstill as well as at least one standstill state, in which the motor vehicle is held in a stationary position by an automatic brake activation and from which the motor vehicle is only able to drive off again via an operational command by a driver, wherein:
    the operational command only becomes effective when a confirmation signal is present in addition to the operational command; and
    a standstill state is only attained if the conditions for a stop-and-go regulation are no longer satisfied.

2. The cruise control system as recited in claim 1, wherein:
    the operational command is produced in response to the driver pressing an accelerator pedal, and
    the confirmation signal is produced in response to the accelerator pedal being deflected by at least one of more than a determined minimum distance and for longer than a determined minimum time.

3. The cruise control system as recited in claim 2, wherein:
    the confirmation signal is provided in response to a time integral of the deflection of the accelerator pedal exceeds a determined threshold value.

4. The cruise control system as recited in claim 1, wherein:
    in the at least one standstill state a drive-off indication is output to the driver when the target object starts moving again,
    the operational command for driving off from the at least one standstill is provided in response to a pressing of a button, and
    the confirmation signal is provided in response to the pressing of the button taking place within a determined time interval after output of the drive-off indication.

5. The cruise control system as recited in claim 1, wherein:
    the operational command for driving off from the at least one standstill state becomes effective only when an additional confirmation signal is present.

6. The cruise control system as recited in claim 1, wherein:
the at least one standstill state includes multiple standstill states.

7. The cruise control system as recited in claim 1, wherein:
in response to an activation a brake pedal when the motor vehicle is stationary, the controller goes into the at least one standstill state.

8. The cruise control system as recited in claim 1, wherein:
when a button is pressed for inactivating the stop function when the motor vehicle is stationary, the controller goes into the at least one standstill states.

9. The cruise control system as recited in claim 1, wherein:
the at least one standstill state is able to be overridden by one of engaging a hand brake and setting a gear selector lever to a position which is not provided for driving forward.

* * * * *